Nov. 29, 1938.  P. I. SCHULTZ ET AL  2,138,125
CONTROL VALVE
Filed Nov. 2, 1936
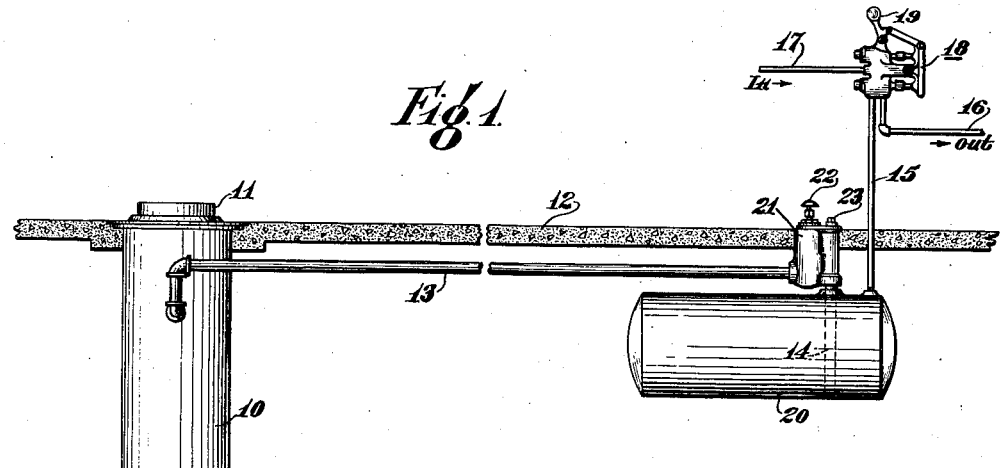
INVENTOR.
Paul I. Schultz, and
James J. Pelouch.
BY Woodling and Krost.
ATTORNEY.

Patented Nov. 29, 1938

2,138,125

UNITED STATES PATENT OFFICE 2,138,125

CONTROL VALVE

Paul I. Schultz and James J. Pelouch, Cleveland, Ohio, assignors to The United States Air Compressor Company, Cleveland, Ohio, a corporation of Ohio Application November 2, 1936, Serial No. 108,734

4 Claims. (Cl. 251—130)

Our invention relates to control valves and more particularly to a control valve in a fluid system for a hydraulic lift wherein the control valve is mounted below the surrounding ground or surface.

An object of our invention is to provide a compact and self-contained control valve easily mounted and demounted.

Another object is to provide a control valve having a valve assembly of a valve seat member, a valve member, a supporting member and a resilient member mounted internally of the casing of the valve assembly.

Another object is to provide a control valve adapted to be mounted below a surface with only its upper end accessible so that the valve assembly may be mounted within the casing by inserting through an opening in the accessible upper end.

Another object is to provide a casing for a control valve, which casing is adapted to receive a valve assembly through its open end and to carry the assembly internally of the casing.

Another object is to provide a control valve having a support for the valve which support is carried internally of the casing of the control valve near the junction of two chambers in the casing.

Another object is to provide a control valve having a casing adapted to contain and to carry the valve and the resilient means for supporting the valve.

Another object is to provide a control valve having a casing adapted to carry internally of the casing resilient means for supporting the valve and resilient means for supporting the operating means which operate the valve.

Another object is to provide a casing for a control valve which has a compartment for receiving fluid introduced into the fluid system, the compartment having an opening in its upper end for receiving the introduced fluid.

Another object is to provide a control valve having a casing for containing the valve assembly and also having means for introducing additional fluid into the fluid system.

Another object is to provide a control valve adapted to be mounted below a surface in which only its upper end is accessible, the casing of the control valve having two openings in the said upper end, one of the openings being adapted to receive the valve assembly mounted within the casing and the other opening in the upper end being adapted to receive fluid introduced into the system.

Another object is to provide a casing for a control valve, which casing may be embedded in a mass with only one end of the casing accessible, said casing being adapted to permit the replacement of the valve assembly through the said end and also being adapted to receive fluid introduced into the fluid system.

Another object is to provide a casing for a control valve, which casing has a conduit within its walls adapted to conduct compressed air or auxiliary fluid into the tank containing the oil or fluid of the system, the said casing being adapted to be mounted upon the said tank.

Other objects and a fuller understanding of our invention may be had by referring to the following description and claims, taken in conjunction with the accompanying drawing, in which:

Figure 1 is a view of my device mounted in a fluid system for a lifting device, our device being mounted in a bed of concrete;

Figure 2 is a cross-sectional view of our control valve device;

Figure 3 shows a modified form of the casing of our control valve device.

Referring to Figure 1, we show the fluid system used for operating a lifting device for automobiles and the like. The lift cylinder 10 containing the ram 11 is mounted below the ground surface and imbedded in the concrete bed 12. Oil or other fluid supplied through the pipe 13 under presses raises the ram 11 in the cylinder 10 and upon releasing of the oil or fluid from pressure in the cylinder 10, the ram 11 is lowered.

Fluid for operating the lifting device is stored in the tank or reservoir 20 also imbedded below the ground surface. The oil or fluid in the tank 20 when put under pressure is forced up through the pipe 14, through the casing 21 of our control valve and out through the pipes 13 to the cylinder 10. When it is desired to release the pressure of the fluid in the cylinder 10, the control valve is opened by depressing the button 22, thus permitting the fluid to flow back from the cylinder 10 into the tank 20. The screw cap 23 fits into an opening in the top of the casing for the closing thereof. Additional fluid may be introduced into the system and tank 20 by removing the screw cap 23 and pouring fluid down into the casing. Since the casing 21 is imbedded in the concrete bed 12 and surrounded thereby, only the upper end of the casing 21 is accessible. By having the casing 21 surrounded by the concrete and with its top substantially flush thereto, there is no sump or depression in which fluid, such as water and oil from the surrounding ground surface, may collect. The danger and inconvenience of a sump or depression in the ground surface where it may be stepped in by persons is well known. Plate covers are sometimes used to cover the sump but these are inconvenient and not always safe as they easily become broken or dislodged from position. Since the internal parts of our control valve may be reached through the upper end of the casing 21, it is not necessary to have a sunken box or sump in which to mount our control valve. Our control valve, being compact and self-contained, may be repaired and have its internal parts replaced through the upper end of the casing 21 without the danger and nuisance of a sump or sunken box for containing the control valve.

The oil or other fluid in the tank 20 is put under pressure and forced up through the pipe 14 and through the casing 21 by the introduction of compressed air or other auxiliary fluid into the top of the tank 20 through the pipe 15. The compressed air from a source not shown is brought into the pipe 17 to the three-way valve 18, which communicates with the pipes 15 and 16. When the handle 19 of the three-way valve 18 is to the left or "up" position, the compressed air coming through the pipes 17 is introduced through the pipes 15 and into the top of the tank 20. The pressure of the compressed air forces the fluid in the tank 20 up through the pipe 14, through the casing 21 and into the cylinder 10, thus raising the ram 11. The control valve in the casing 21 automatically locks the fluid so that it will not flow back into the tank 20 after the air pressure is released. Therefore, after the ram 11 has been raised to a sufficient degree, the air pressure may be released by moving the handle 19 to the right or to the "down" position, so that the three-way valve 18 permits the compressed air in the tank 20 and the pipe 15 to flow off through the outlet pipe 16. When the handle 19 is in an upright or "neutral" position, then both the inlet pipe 17 and the outlet pipe 16 are closed and no air flows through the three-way valve 18, and the pipe 15 is closed at the valve 18.

In Figure 2, we show the construction of our control valve in detail, the view being a cross-section therethrough. The casing 21 has an upper chamber 24 and a lower chamber 25. The lower chamber 25 has a port 26 in which the pipe 13 is threadably engaged. The upper chamber 24 has a port 27 in communication therewith. Running along the side of the two chambers and within the casing 21 is the compartment 29 which communicates with the upper chamber 24 through the port 27. The lower end of the chamber 29 has a port 28 in which the pipe 14 is threadably engaged. The upper end of the compartment 29 has a port 30 adapted to receive fluid introduced into the system. This port 30 is kept closed except when the system is being refilled, by the screw cap 23 threadably engaged therein. A measuring rod 31 is securely mounted by threads or otherwise to the bottom of the cap 23 and extends vertically and downwardly therefrom. The depth of the fluid in the tank or reservoir 20 can be determined by removing the screw cap 23 and raising the measuring rod 31 upwardly. This measuring is done after the fluid has remained still for a time so the height upon the measuring rod 31 to which the fluid adheres to the measuring rod 31 indicates the depth of the fluid in the system.

The valve assembly denoted generally by the reference character 41 is threadably mounted inwardly of the casing 21 and carried by the walls thereof. The valve assembly 41 consists of the valve seat member 42, the cage or supporting portion 47 extending downwardly from the valve seat member 42, the bottom of the cage 48 threadably engaged to the sides of the cage 47, the guide portion 46 extending upwardly from the bottom 48, the valve member 43 situated in the opening of the valve seat member 42, the valve stem 44 extending downwardly from the valve member 43, and the coil spring 45 engaging at one end the valve member 43 and at the other end the cage bottom 48. The valve assembly 41 is assembled as a unit outside of the casing 21 and inserted and mounted in place in one operation. An opening 32 is provided in the upper end of the casing 21 and the assembled valve assembly is inserted through this opening 32 into the casing and screwed down into position shown in Figure 2. The shoulders of the upper side of the valve seat member meet the inwardly protruding shoulders extending from the walls of the casing and prevent the valve seat member 42 from being turned or screwed in too far. It is seen from the drawing that the valve seat member has an opening extending therethrough and that the valve member 43 when in an upward position blocks this opening but when in a downward position does not block the opening and thereby permits communication between the chambers 24 and 25. The tension of the coil spring 45 is just sufficient to support the weight of the valve member 43 and to normally hold it in a closed position up in the opening of the valve seat member 42. However, any downward pressure upon the valve member 43 overcomes the tension of the spring 45 and forces the valve member 43 down permitting communication between the chambers 24 and 25. The fluid under pressure coming up through the pipe 14 enters the compartment 29 and into the chamber 24 and by its pressure forces the valve member 43 downwardly and thereby permits the fluid under pressure to enter the chamber 25 and out through the pipe 13. However, in the event that there is any back pressure through the pipe 13 which carries back into the chamber 25, the fluid subjected to such back pressure forces the valve member 43 upward into a closed position as shown in Figure 2. The bearing edges of the valve member 43 are bevelled and the fluid under back pressure presses against the bottom end of the valve member and thereby forces the bevelled edge portion tightly against the valve seat member 42. The guide portion 46 on the bottom cage 48 has a recess as shown in the drawing which holds the valve stem 44 and permits the valve stem 44 to slide up and down in a vertical direction and at the same time guide its movement.

It is therefore seen that the valve 43 acts as a lock so as to permit the movement of the fluid under pressure in one direction through the fluid system but blocks its movement in the opposite direction. By referring to both Figures 1 and 2, it is seen that after the ram 11 has been lifted and the air pressure in the tank 20 has been released, that the fluid is still blocked from coming back from the cylinder 10 into the tank 20 by means of the blocking action of my control valve. The air pressure may fail or the air may leak but the ram 11 will still be held in a raised position as the fluid cannot escape back through the pipe 13 into the tank 20.

However, when it is desired or necessary to lower the lift and to permit the fluid to escape from the cylinder 10 back into the tank 20, it is necessary to unlock the control valve. To provide for this unlocking action a plunger 37 is mounted vertically over the valve member 43. The plunger 37 is slidably mounted within an opening centrally located in the closure 33, and closure 33 is threadedly engaged to the casing 21 so as to close the opening 32. The plunger 37 is surrounded and packed with the packing 34 which is held down tightly by means of the packing ring 35. The packing ring 35 is pressed downwardly on the packing 34 and held in position by means of the threaded nut 36 which has internal threads which engage the external threads provided on the closure 33. A button 22 is secured to the upper end of the plunger 37 by means of the pin 66 extending through registered openings in the plunger and button.

It is therefore seen that the plunger 37 is slidably mounted within the opening of the closure 33 in such a way that fluid is prevented from leaking out or escaping through the opening 32 in the top of the casing. The plunger 37 has a collar 38 securely attached thereto, which collar is larger than the opening extending through the closure 33 and thereby the upward movement of the plunger 37 through the opening in the closure 33 is limited by the meeting of the collar 38 against the closure 33. Figure 2 shows the plunger 37 in its most raised position. The plunger 37, however, is free to move downwardly upon the pressing down of the button 22. In order to support the weight of the plunger and to hold it in a normally raised position. We have mounted on the lower end of the plunger 37 a collar 39 which slidably engages the plunger 37 and contacts the collar 38. A coil spring 40 surrounding the lower end of the plunger 37 is mounted in the upper chamber 24 and has its lower end resting upon the valve seat member 42 and has its upper end engaging the collar 39. The tension of the coil spring 40 is such that the plunger 37 is normally held upwardly but by pressing down upon the button 22, the resistance of the coil spring 40 is overcome and the plunger 37 is moved downwardly. The length of the plunger 37 is such that when the button 22 is pressed down, the lower end of the plunger 37 meets and presses upon the top of the valve member 43 and pushes it out of engagement with the valve seat member 42. Therefore, by manually pressing the plunger 37 down, the valve member 43 is forced downwardly and communication between the chambers 24 and 25 thereby established. When it is desired to release the pressure in the tank 10 of the lifting device, and to unlock the control valve, the button 22 is pressed downwardly thereby forcing the valve 43 into an opened position and the fluid will flow from the pipe 13 through the chamber 25, through the chamber 24, through the compartment 29 and out through the pipe 14, into the tank 20. After the fluid has flowed from the cylinder 10 back into the tank 20, then the button 22 is released and the spring 40 forces the plunger 37 upwardly out of contact with the valve member 43 and the control valve is then again in an automatic locking position ready to prevent any back flow of the fluid.

In Figure 3, we show a modified form of the casing 21 in which a conduit 50 is provided in the walls of the casing 21. A threaded extension 49 is provided on the end of the casing 21 and a projecting flange portion 51 is mounted on the tank 20 by means of the welding 52. In this way the casing 21 is mounted directly upon the tank 20 and no intermediate piping is necessary. The structure is also such that only one opening in the tank 20 is necessary as the compressed air from the pipe 15 enters the tank 20 directly through the casing 21, the arrangement eliminates a second hole in the tank 20 and permits the direct mounting of the casing 21 on the tank 20. The pipe 14 is mounted to the casing 21 at the opening of the tank 20.

Although we have described our invention with a certain degree of particularity, it is understood that the present disclosure has been made only by way of example and that numerous changes in the details of construction and the combination and arrangement of parts may be resorted to without department from the spirit and the scope of the invention as hereinafter claimed.

We claim as our invention:

1. A control valve for a fluid system wherein the control valve is mounted below a surface with only the upper end accessible comprising, in combination, a casing having two chambers adapted to intercommunicate and having an inlet port communicating with one of said chambers and having an outlet port communicating with the other of said chambers, the said casing having an opening in said upper end, a valve seat member adapted to be inserted into position in said casing through said opening, the said valve seat member being carried by said casing internally of the casing between said chambers and having an orifice connecting said two chambers, a valve member, said valve member having an enlarged head positioned in said other of said chambers, the said enlarged head being adapted to engage the valve seat member and to control the communication between said chambers through said orifice, said enlarged head having a rearward face positioned in the path of fluid in said other of said chambers, supporting means carried by said valve seat member for guiding and supporting said valve member, resilient means carried by said supporting means for holding the valve member in a normally closed position against the valve seat member, a plunger member extending through said opening in the casing for operating said valve member so that said chambers may be put in intercommunication, said plunger member being extended outwardly of said casing through said opening, means slidably engaging said plunger member for closing said opening, and resilient means carried by said casing internally of the casing for holding said plunger from normally operating said valve member, the arrangement of the casing, valve seat member, valve member, supporting means, and resilient means being such that the said parts may be inserted into place and removed from said casing through said upper opening, and being such that fluid under pressure from the inlet port moves the valve member to open said orifice and fluid under back-pressure from the outlet port and contacting the rearward face of the said enlarged head moves the valve member to close said orifice, and that operation of the valve member by the plunger member re-opens said orifice to permit fluid under back-pressure from the outlet port to flow through said orifice.

2. The combination of a control valve with a container in a fluid system operated by a source of compressed auxiliary fluid in which the control valve is mounted below a surface so that only one end of the control valve is accessible, of a casing having two chambers and having an inlet port in communication with one chamber and an outlet port in communication with the other chamber, the casing having an opening in said one end, said casing having a compartment in communication with said chambers, said compartment having a connection portion adapted to communicate with said container, the said connecting portion being adapted to be mounted on said container, the wall of the said casing having a conduit extending therein from the exterior of said casing to the said connecting portion of the compartment, said conduit being adapted to communicate with said container through said connecting portion and with the said source of compressed auxiliary fluid exterior of said casing, the said compartment being adapted to receive fluid introduced into said fluid system, a valve member carried internally of said casing near the junction of said chambers for controlling the communication between said chambers, said valve member being adapted to be mounted in said casing by inserting through the opening in said one end, means carried by the casing for operating the said valve member, and a closure for the said opening.

3. A fluid control device through which fluid flows into a reservoir and through which fluid flows from the said reservoir comprising, in combination, a casing member having an upper chamber and a lower chamber, valve means carried internally of said casing member for controlling the flow of fluid between said chambers, operating means extending through said casing member for operating the said valve means from outside said casing member, said casing member having a passageway extending therethrough and communicating with said upper chamber, the casing member having an outlet port in communication with said lower chamber and having an inlet port in communication with a lower portion of said passageway, said inlet port being adapted to communicate with said reservoir, the said casing member having an introductory port opening into an upper portion of said passageway for introducing fluid into said casing member, and closure means for closing said introductory port, the arrangement of the inlet port, the outlet port, and the introductory port being such that fluid introduced into said introductory port flows through said passageway, out through the inlet port, and into said reservoir and being such that fluid flowing from said reservoir through the inlet port flows through the passageway into the upper chamber, into the lower chamber, and out through the outlet port.

4. A casing member for a fluid control device through which fluid flows into a reservoir and through which fluid flows from the said reservoir, a casing member having an upper chamber and a lower chamber, the casing member being adapted to carry valve means within the casing member to control the flow of fluid between said chambers, said casing member having a passageway extending therethrough and communicating with said upper chamber, the said casing member having an outlet port in communication with said lower chamber and having an inlet port in communication with a lower portion of said passageway, said inlet port being adapted to communicate with said reservoir, the said casing member having an introductory port opening into an upper portion of said passageway for introducing fluid into said casing member, the arrangement of the passageway, the upper chamber, and the lower chamber in said casing member being such that fluid introduced into said casing member from the introductory port flows through said passageway, out through the inlet port, and into the reservoir and being such that fluid flowing from the reservoir flows through the passageway from the inlet port and into the upper chamber and thence into the lower chamber.

PAUL I. SCHULTZ.
JAMES J. PELOUCH.